United States Patent Office 2,740,781
Patented Apr. 3, 1956

2,740,781

3,26 - DIHYDROXY-16,22-IMINO-5-CHOLESTENES, 3,26 - DIHYDROXY - 16,22 - IMINO - 5,16,20(22)- CHOLESTATRIENES AND DERIVATIVES THEREOF

George P. Mueller, Park Ridge, Ill., assignor, by mesne assignments, to G. D. Searle & Co., Skokie, Ill., a corporation of Delaware No Drawing. Application July 6, 1954,
Serial No. 441,659

7 Claims. (Cl. 260—239.5)

The present invention relates to a new group of pentacyclic pyrroles and pyrrolidines and, more particularly, to 3,26-dihydroxy-16,22-imino-5-cholestenes, and 3,26-dihydroxy-16,22-imino-5,16,20(22)-cholestatrienes and derivatives thereof.

The compounds of my invention can be represented by the structural formulas

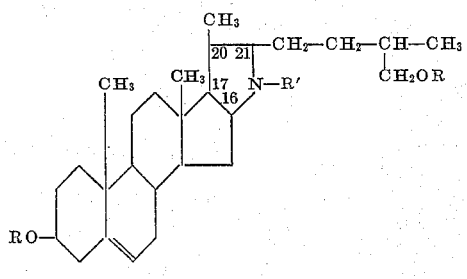

and

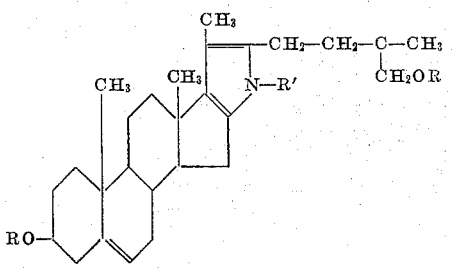

wherein R and R' represent hydrogen, lower alkyl and lower alkyl-CO— radicals. These lower alkyl groups can be methyl, ethyl, straight-chained and branched propyl, butyl, amyl and hexyl radicals.

The compounds of my invention are conveniently prepared from kryptogenin by reaction with ammonia or a lower monoalkylamine.

Heating of kryptogenin with ammonia yields 3,26-dihydroxy-16,22-imino-5,16,20(22)-cholestatriene, even when the reaction is carried out in a hydrogen atmosphere. However, if the reaction is carried out in the presence of formic acid, the principal product of the reaction is 3,26 - dihydroxy - 16,22 - imino-5-cholestene. Reaction of kryptogenin with a lower alkyl amine in a lower alkanoic acid containing at least two carbon atoms such as acetic acid yields an N-alkyl-3,26-dihydroxy-16,22-imino-5,16,-20(22)-cholestatriene. Substitution of formic acid for the acetic acid favors formation of the N-alkyl-3,26-dihydroxy-16,22-imino-5-cholestene. These reactions can likewise be carried out with the 3,26-diacyl and 3,26-dialkyl ether derivatives.

The 3,26-dihydroxy-16,22-iminocholestenes and cholestatrienes can be readily acylated at both oxygen atoms and the nitrogen atom by treatment with the corresponding acyl halides or anhydrides.

The organic bases of my invention form pharmaceutically useful salts which are non-toxic in therapeutic dosage with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

By my invention I have provided a new group of valuable medicinal agents particularly for the correction of abnormal heart action and hypertension. The compounds are valuable intermediates for the synthesis of hormonally active substances. Thus, Oppenauer oxidation yields 4-cholesten-3-one derivatives with gonadal hormone activity which can be further improved by side-chain degradation. Useful hydroxylated derivatives are obtained by microbiological oxidation with fungi of the Mucorales, Streptomyces, Penicillium, and Curvularia types.

The following examples will illustrate in further detail certain of the compouunds which constitute my invention and methods for their preparation. However, my invention is not to be construed as limited thereby in spirit or in scope. In these examples, quantities of materials are indicated in parts by weight. The melting points were determined in evacuated tubes.

Example 1

A solution of 10 parts of kryptogenin, 38.5 parts of ammonia and 80 parts of ethanol is heated for 4 hours in an autoclave, the final pressure being 33 atmospheres. After cooling the solution is stirred with charcoal and filtered with the aid of a filter aid. The filtrate is concentrated at room temperature in a nitrogen atmosphere to yield a glass. On repeated recrystallization from acetone, 3β,26-dihydroxy-16,22-imino-5,16,20(22)-cholestatriene is obtained in white crystals which melt at about 196.8–199.0° C. The specific rotation of a chloroform solution $[\alpha]_D^{25}$ is $-251°$. Infrared maxima are observed at 2.98 to 3.02, 5.88 and 6.02 microns. The compound has the structural formula

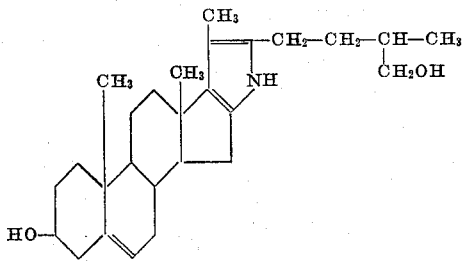

Example 2

To a cold solution of 105 parts of concentrated ammonia in 80 parts of formic acid are added 4.3 parts of kryptogenin and the solution is distilled slowly under an atmosphere of nitrogen. The temperature finally reaches 134–137° C., where it is maintained for 2 hours. A light-tan oil forms which solidifies on cooling. The precipitate is separated, washed with water, and taken up in 55 parts of ethanol. 30 parts of potassium hydroxide in 20 parts of water are added and the mixture is heated on the steam bath in a nitrogen atmosphere for 3 hours. The mixture is then diluted with water and extracted with ether. The ether solution is washed with water, aqueous sodium chloride solution, dried over sodium sulfate and finally freed from solvent by vacuum distillation. The resulting clear brownish glass is dissolved in a mixture of chloroform and benzene and thus applied to a chromatography column containing 150 parts of alumina. The column is eluted successively with 1000 parts of a 25% solution of chloroform in benzene, 700 parts of a 20% solution of ethyl acetate in benzene (which elute a compound forming plates melting at about 190–196° C.), 900 parts of a 40% solution of ethyl acetate in benzene, and finally with ether. The last eluant first removes a gummy material and then elutes a white crystalline solid which, recrystallized from ethyl acetate, yields 3β,26-dihydroxy-16,22-imino-5-cholestene in tapered needles melting at about 176.5–177.8° C. The compound has the structural formula

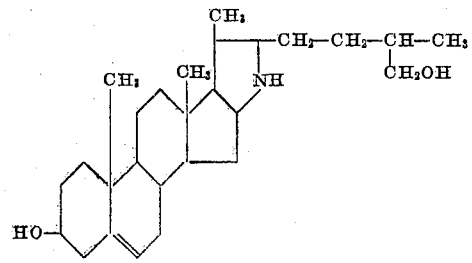

The specific rotation of a chloroform solution is $[\alpha]_D^{25} = -29°$

The infrared absorption spectrum determined in a potassium bromide disc, shows maxima at 2.86, 3.06 and 9.51 microns.

A solution of 1 part of 3β,26-dihydroxy-16,22-imino-5,16,20(22)-cholestatriene in 400 parts of methanol and 500 parts of 1.2-N hydrochloric acid is concentrated in vacuo on a steam bath. A fine precipitate is formed which is collected on a filter. Recrystallized from methanol and ether the hydrochloride thus obtained melts at about 305–310° C. The specific rotation of a methanol solution $[\alpha]_D^{25}$ is $-10.4°$.

*Example 3*

A solution of 1 part of 3β,26-dihydroxy-16,22-imino-5,16,20(22)-cholestatriene in 55 parts of acetic anhydride is refluxed for 30 minutes and then poured into cold water and extracted with ether. The ether extract is washed successively with aqueous sodium bicarbonate, water and saturated sodium chloride solution. It is then dried over anhydrous calcium sulfate, filtered and evaporated. The residual oil is crystallized repeatedly from low boiling petroleum ether. The 3β,26-diacetoxy-16,22-acetimino-5-cholestene thus obtained forms irregular plates which start to melt at 97–98° C. and melt completely at about 103° C. The optical rotation of a chloroform solution is $[\alpha]_D^{25} = -37.6°$. The infrared absorption spectrum shows maxima at 5.76, 5.79, 6.09 and 8.05 microns. The compound has the structural formula

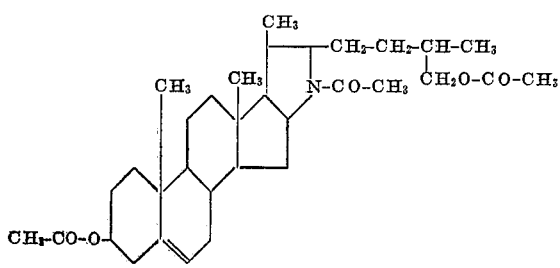

*Example 4*

A mixture of 153 parts of a 35% solution of methylamine, 103.2 parts of glacial acetic acid and 5 parts of kryptogenin is gradually heated with stirring under nitrogen to 120–130° C. and maintained at that temperature for 90 minutes. After standing for 12 hours, the mixture is diluted with water. A solid precipitate is collected by centrifugation and filtration. Upon repeated recrystallization from methanol the 3β,26-dihydroxy-16,21-methylimino-5,16,20(22)-cholestatriene thus obtained melts at about 223.3–224.2° C. It has the structural formula

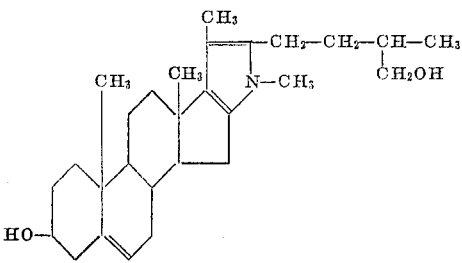

*Example 5*

A mixture of 153 parts of a 35% aqueous solution of methylamine, 80 parts of formic acid and 5 parts of kryptogenin is heated with vigorous stirring under nitrogen. The temperature is gradually raised to 132° C. so as to avoid an excessively rapid formation of carbon dioxide and then maintained at 130–132° C. for ½ hour, the total heating time being about 3 hours. The mixture is then cooled and the solid precipitate, melting at about 203–207° C., is collected by filtration. The filtrate is added slowly to a solution of 120 parts of potassium hydroxide in 250 parts of water at 20° C. The resulting suspension is extracted with ether. This ether extract is washed with water, dried and concentrated until crystallization starts. The precipitate is collected and recrystallized from ethyl acetate. The 3β,26-dihydroxy-16,22-methylimino-5-cholestene thus obtained melts at about 213.5–214.4° C. The specific rotation of a chloroform solution $[\alpha]_D^{25}$ is $-54°$. The compound has the structural formula

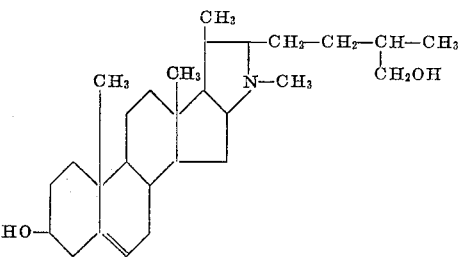

*Example 6*

A solution of 1 part of 3β,26-dihydroxy-16,22-methylimino-5-cholestene in 50 parts of acetic anhydride is refluxed for 30 minutes, cooled and poured into cold water and ice. After completion of the hydrolysis of the acetic anhydride, the reaction mixture is extracted with ether. The extract is washed with water and aqueous sodium bicarbonate and sodium chloride solutions, dried and concentrated under vacuum. The oily residue crystallizes on standing within a few minutes. Crystallized from low boiling petroleum ether, the 3β,26-diacetoxy-16,22-methylimino-5-cholestene forms plates which melt at about 98.5–100.4° C. Infrared absorption maxima are observed at 5.79 and 8.03 microns. The compound has the structural formmula

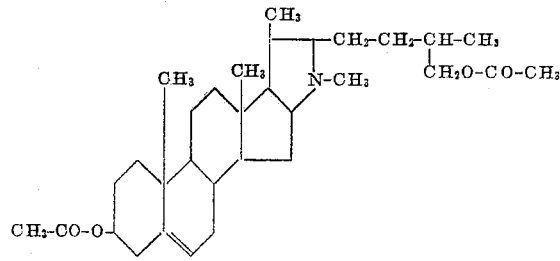

*Example 7*

A stirred mixture of 13 parts of ethylamine, 20.2 parts of glacial acetic acid and 1 part of kryptogenin is maintained in a nitrogen atmosphere and gradually heated to about 125° C. where it is kept for 2 hours. The reaction mixture is permitted to stand for 5 hours at room temperature and then diluted with water. By centrifugation and filtration there is obtained the crystalline 3β,26-dihydroxy-16,21-ethylimino-5,16,20(22)-cholestatriene which has the structural formula

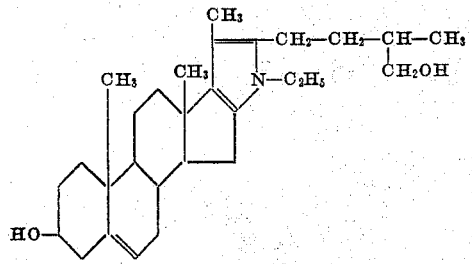

The ultraviolet absorption spectrum of this compound shows a maximum at about 230 to 240 millimicrons. Infrared maxima are observed at 3.01, 5.89, 8.07, 9.45 and 10.48 microns.

*Example 8*

Under a nitrogen atmosphere a mixture of 21 parts of butylamine, 20 parts of formic acid and 1 part of kryptogenin is stirred and gradually heated to about 130° C. where the temperature is maintained for an hour. Upon cooling, an initial crop of crystals is obtained which is collected by filtration. The filtrate is worked up by the method of Example 5. There is thus obtained the 3β,26-dihydroxy-16,22-butylimino-5-cholestene of the structural formula

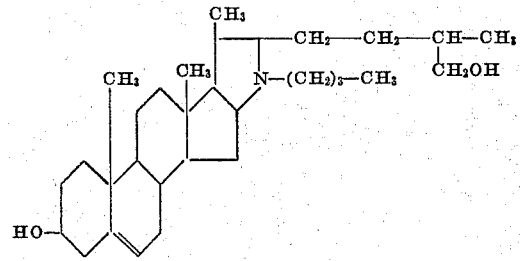

The infrared absorption spectrum shows maxima at 3.01, 6.90, 7.27 and 9.52 microns.

I claim:

1. A member of the class consisting of the compounds of the structural formulas

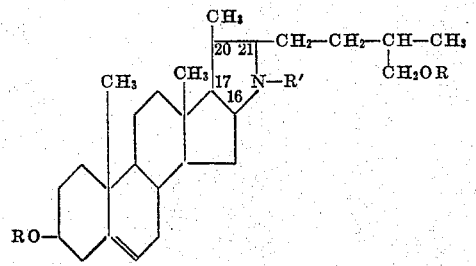

and

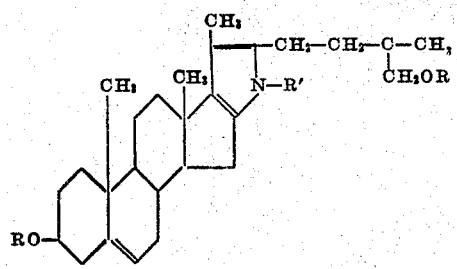

wherein R represents a member of the class consisting of (lower alkyl)-CO— and hydrogen radicals and R' represents a member of the class consisting of lower alkyl, (lower alkyl)-CO— and hydrogen radicals.

2.

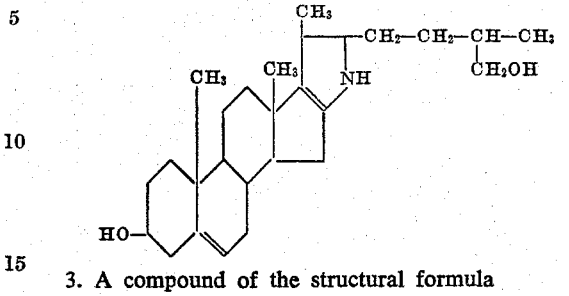

3. A compound of the structural formula

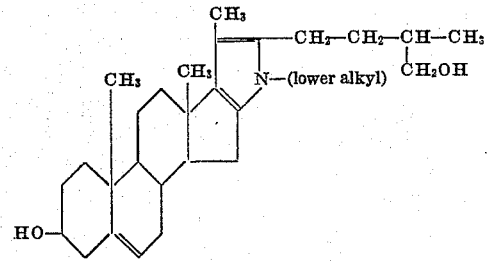

4.

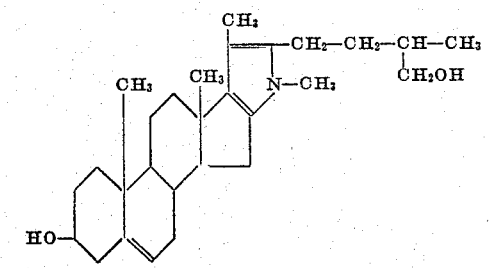

5.

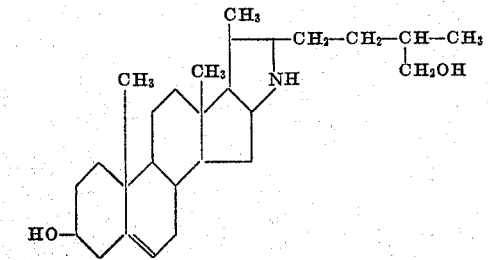

6.

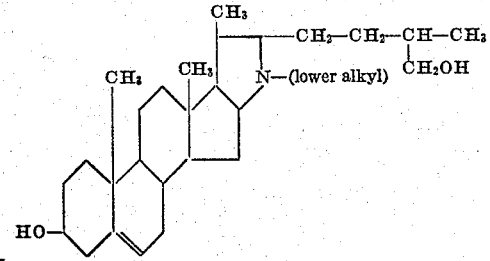

7.

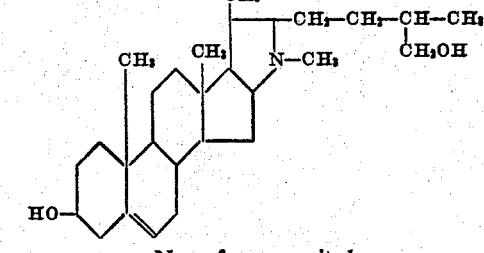

No references cited.